(12) United States Patent
Yamaguchi

(10) Patent No.: US 11,167,985 B2
(45) Date of Patent: Nov. 9, 2021

(54) DRAWING DEVICE AND DRAWING METHOD

(71) Applicant: LINTEC CORPORATION, Tokyo (JP)

(72) Inventor: Kazuhisa Yamaguchi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 383 days.

(21) Appl. No.: 16/067,791

(22) PCT Filed: Dec. 22, 2016

(86) PCT No.: PCT/JP2016/088281
§ 371 (c)(1),
(2) Date: Jul. 2, 2018

(87) PCT Pub. No.: WO2017/119309
PCT Pub. Date: Jul. 13, 2017

(65) Prior Publication Data
US 2019/0009236 A1  Jan. 10, 2019

(30) Foreign Application Priority Data
Jan. 5, 2016 (JP) ................. 2016-000679

(51) Int. Cl.
*C01B 32/16* (2017.01)
*B82B 3/00* (2006.01)
*D02J 1/22* (2006.01)
*B01J 4/00* (2006.01)

(52) U.S. Cl.
CPC ............ *B82B 3/0057* (2013.01); *B01J 4/007* (2013.01); *C01B 32/16* (2017.08); *D02J 1/22* (2013.01)

(58) Field of Classification Search
CPC ............................ C01B 32/158; C01B 32/168
See application file for complete search history.

(56) References Cited

U.S. PATENT DOCUMENTS

2007/0237959 A1* 10/2007 Lemaire ............... B82Y 40/00
                                                       428/408
2008/0018012 A1    1/2008 Lemaire et al.
(Continued)

FOREIGN PATENT DOCUMENTS

CN     102741161 A    10/2012
CN     102815667 A    12/2012
(Continued)

OTHER PUBLICATIONS

Inagrma, JP2014-237563 eng mach trans, Dec. 2014 (Year: 2014).*
(Continued)

*Primary Examiner* — Joseph A Miller, Jr.
(74) *Attorney, Agent, or Firm* — McDermott Will & Emery LLP

(57) ABSTRACT

A drawing apparatus includes a support for supporting a part of the grown form and a drive unit for causing a relative movement of the support and the grown form. The support includes a plurality of support units arranged in a width direction of the grown form orthogonal to a drawing direction of a plurality of extended forms, the plurality of support drawing the plurality of extended forms from the single grown form.

4 Claims, 2 Drawing Sheets

(56) References Cited

U.S. PATENT DOCUMENTS

| | | | |
|---|---|---|---|
| 2009/0087543 A1* | 4/2009 | Nicholas | B82Y 30/00 427/10 |
| 2010/0270704 A1 | 10/2010 | Feng et al. | |
| 2010/0282403 A1* | 11/2010 | Liu | B82Y 40/00 156/229 |
| 2011/0052478 A1* | 3/2011 | Feng | D06M 13/144 423/447.1 |
| 2011/0117316 A1 | 5/2011 | Lemaire | |
| 2018/0363237 A1* | 12/2018 | Huynh | C01B 32/168 |

FOREIGN PATENT DOCUMENTS

| | | |
|---|---|---|
| JP | 2010-254567 A | 11/2010 |
| JP | 2014-237563 A | 12/2014 |
| WO | 2009/054422 A1 | 4/2009 |

OTHER PUBLICATIONS

International Search Report issued in corresponding International Patent Application No. PCT/JP2016/088281, dated Mar. 21, 2017.
Extended European Search Report issued in corresponding European Patent Application No. 16883808.4, dated Aug. 1, 2019.
International Search Report issued in corresponding International Patent Application No. PCT/JP2016/0288281, dated Mar. 21, 2017.
Office Action issued in corresponding Japanese Patent Application No. 2016-000679, dated Sep. 3, 2019, with English translation.
Chinese Office Action issued in corresponding Chinese Patent Application No. 201680077749.3, dated Dec. 24. 2020, with English translation.

* cited by examiner

DRAWING DEVICE AND DRAWING METHOD

CROSS REFERENCE

This application is the U.S. National Phase under 35 U.S.C. § 371 of International Application No. PCT/JP2016/088281, filed on Dec. 22, 2016, which claims the benefit of Japanese Application No. 2016-000679, filed on Jan. 5, 2016, the entire contents of each are hereby incorporated by reference.

TECHNICAL FIELD

The present invention relates to a drawing apparatus and a method of drawing.

BACKGROUND ART

According to a typically known method, carbon nanotube sheet (extended form) is drawn from an array (grown form) produced by growing carbon nanotubes (for instance, see Patent Literature 1).

CITATION LIST

Patent Literature(s)

Patent Literature 1 JP 2010-254567 A

SUMMARY OF THE INVENTION

Problem(s) to Be Solved by the Invention

However, the typical method as disclosed in Patent Literature 1, which is intended to draw an extended form with a predetermined width from a single grown form, requires a cutter for cutting the drawn extended form if an extended form with a width shorter than the predetermined width is needed. The apparatus size is thus disadvantageously increased.

An object of the invention is to provide a drawing apparatus and a method of drawing not requiring an increase in an apparatus size.

Means for Solving the Problem(s)

To achieve the above object, according to an aspect of the invention, a drawing apparatus for drawing a plurality of extended forms from a single grown form produced by growing carbon nanotubes includes: a support configured to support a part of the grown form; and a drive unit configured to cause a relative movement of the support and the grown form, in which the support includes a plurality of support units arranged in a width direction of the grown form orthogonal to a drawing direction of the extended form, the plurality of support units drawing the plurality of extended forms from the single grown form.

In the above aspect, it is preferable that the support includes an assist unit configured to assist the drawing of the plurality of extended forms so that the plurality of extended forms to be drawn out do not contact each other.

Further, it is preferable that the drive unit causes a relative movement of the plurality of support units so that adjacent ones of the plurality of support units are separated away from each other.

According to another aspect of the invention, a method of drawing a plurality of extended forms from a single grown form produced by growing carbon nanotubes includes supporting a part of the grown form with a plurality of support units arranged in a width direction of the grown form orthogonal to a drawing direction of the extended forms; and causing a relative movement of the plurality of support units and the grown form to draw the plurality of extended forms from the single grown form.

The above aspects eliminate the necessity of cutting the drawn extended form using a cutter, thus not requiring an increase in an apparatus size.

Further, the assist unit assists the drawing of the plurality of extended forms. Such a simple configuration allows the plurality of extended forms to be easily drawn.

Further, when the drive unit causes a relative movement of the support units so that adjacent ones of the plurality of support units are separated from each other, the plurality of extended forms can be drawn without contact.

BRIEF DESCRIPTION OF DRAWING(S)

DESCRIPTION OF EMBODIMENT(S)

An exemplary embodiment of the invention will be described below with reference to the attached drawings.

X-axis, Y-axis and Z-axis according to the exemplary embodiment are orthogonal to one another. The X-axis and the Y-axis are defined within a predetermined plane and the Z-axis is orthogonal to the predetermined plane. Further, the exemplary embodiment is basically described as viewed in an arrow direction AR parallel to the Y-axis. Specifically, directions referred to in the description include "top" meaning an arrow direction along the Z-axis and "down" meaning the direction opposite thereto, "right" meaning an arrow direction along the X-axis and "left" meaning the direction opposite thereto, and "front" meaning an arrow direction along the Y-axis and "rear" meaning the direction opposite thereto.

Figure 1A:
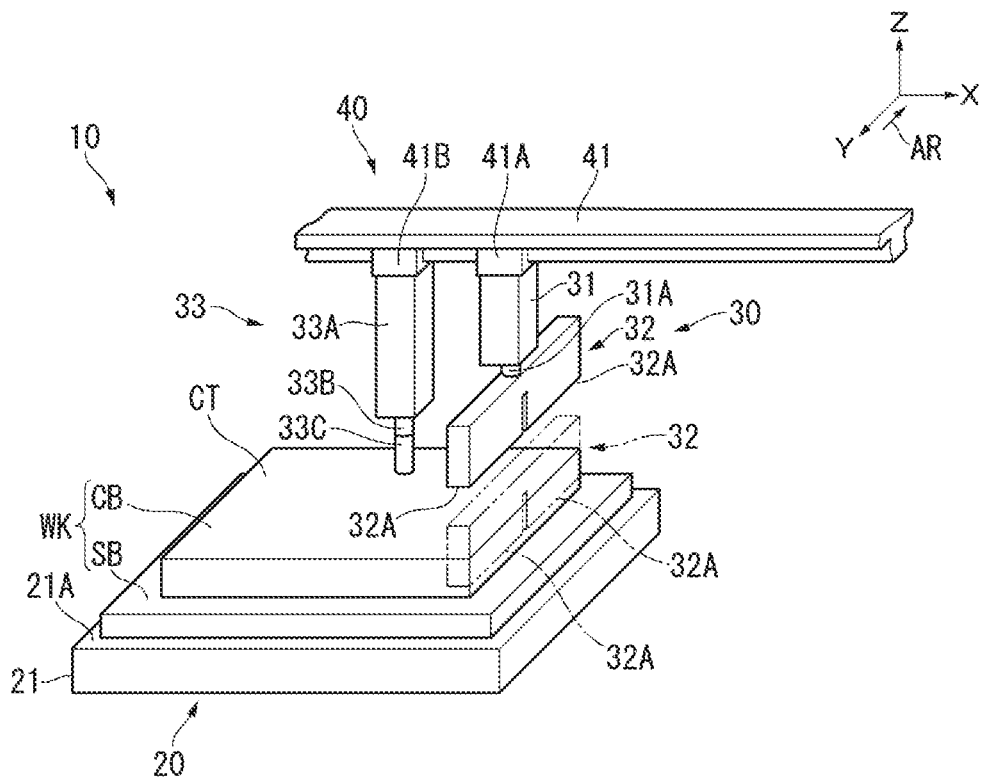
FIG. 1A is a perspective view showing a drawing apparatus according to an exemplary embodiment of the invention.
Figure 1B:
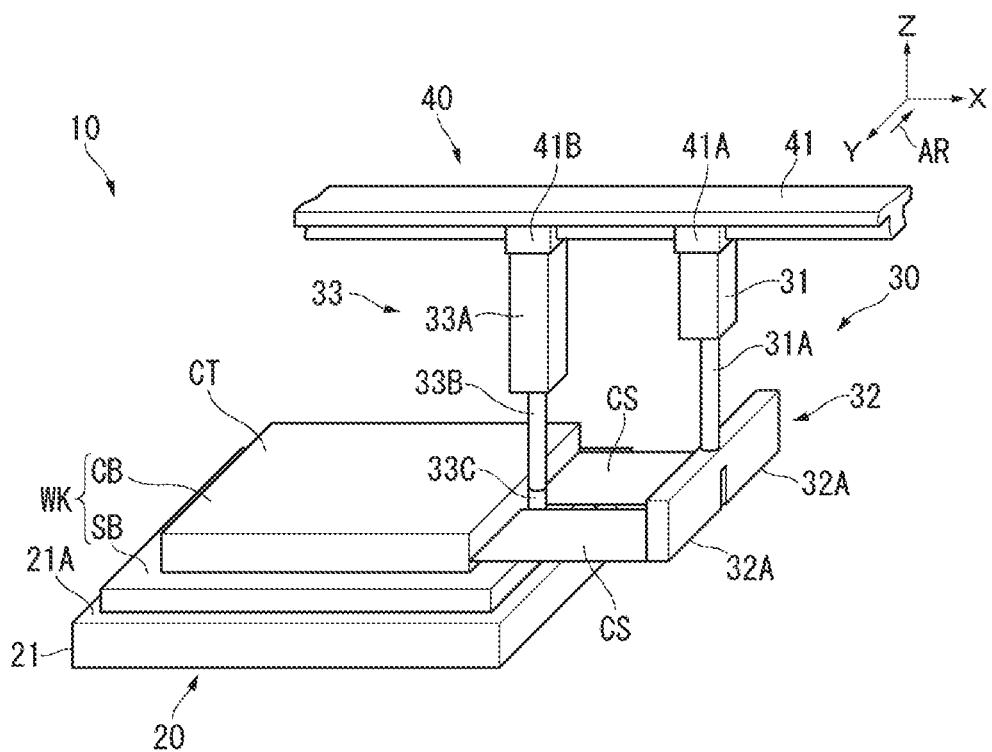
FIG. 1B illustrates an operation of the drawing apparatus according to the exemplary embodiment of the invention.

Referring to FIGS. 1A and 1B, a drawing apparatus 10, which is configured to draw an extended form, or a belt-shaped carbon nanotube sheet CS (occasionally simply referred to as "sheet CS" hereinbelow), from a grown form CB produced by growing carbon nanotubes CT, includes a holder 20 configured to hold the grown form CB, a support 30 configured to support a part of the grown form CB, and a drive unit 40 configured to cause a relative movement of the support 30 and the grown form CB. It should be noted that the grown form CB, which is produced by growing the carbon nanotubes CT upward from a first surface of a substrate SB, and the substrate SB, which supports the grown form CB, form an integrated workpiece WK.

The holder 20 includes a table 21 having a holding surface 21A for sucking and holding the integrated workpiece WK from a second surface of the substrate SB using a decompressor such as a decompression pump and a vacuum ejector (not shown).

The support 30, which is supported by an output shaft 31A of a linear movement motor 31 (drive device), includes:

a support member 32 that includes two support units 32A arranged side by side in a width direction (front-rear direction) of the grown form CB orthogonal to a drawing direction (right direction) of the sheet CS: and an assist unit 33 configured to assist the drawing so that the sheet CS is drawn into a plurality of sheets without contact, the two support units 32A allowing for drawing the two sheets CS from the single grown form CB.

The assist unit 33 includes an assist member 33C supported by an output shaft 33B of a linear movement motor 33A (drive device).

The drive unit 40 includes a linear motor 41 (drive device) that includes a first slider 41A supporting the linear movement motor 31 and a second slider 41B supporting the linear movement motor 33A.

Description will be made on a process of drawing the plurality of sheets CS from the grown form CB using the drawing apparatus 10.

Initially, as shown in FIG. 1A, an operator inputs a signal for starting an automatic operation to the drawing apparatus 10, in which the components are set at respective initial positions shown by solid lines, using an input unit such as an operation panel and a personal computer (not shown). Further, after the operator or a transport unit such as a multijoint robot and a belt conveyor (not shown) mounts the integrated workpiece WK at a predetermined position on the holding surface 21A, the holder 20 drives the decompressor (not shown) so that the integrated workpiece WK is sucked to be held on the holding surface 21A. Subsequently, the drive unit 40 drives the linear motor 41 to move the first slider 41A so that a right end of the grown form CB is placed immediately below the support member 32 and then the support 30 drives the linear movement motor 31 to move the support member 32 downward as shown by chain double-dashed lines in FIG. 1A so that a lower end of each of the support units 32A is pressed against the right end of the grown form CB. At this time, the grown form CB adheres to the lower end of each of the support units 32A due to a viscosity thereof.

Subsequently, as shown in FIG. 1B, the drive unit 40 drives the linear motor 41 to move the support member 32 rightward to a position for the assist member 33C to be placed between the grown form CB and the support member 32. As the support member 32 is moved, the grown form CB is agglomerated by an intermolecular force of the carbon nanotubes CT and drawn into the two belt-shaped sheets CS, which are supported by the moved support member 32 and arranged along the drawing direction. Subsequently, the drive unit 40 and the support 30 drive the linear motor 41 and the linear movement motor 33A respectively to insert the assist member 33C between the two sheets CS. The drive unit 40 then drives the linear motor 41 to move the support member 32 further rightward so that the two belt-shaped sheets CS are drawn. When an end of each of the sheets CS in the drawing direction reaches a receiver (not shown) such as a take-up device for taking up the sheets CS and a cutter for cutting the sheets CS, the support 30 drives the linear movement motor 31 to transport the sheets CS to the receiver. When all or a predetermined amount of the grown form CB on the substrate SB is drawn into the sheets CS, the holder 20 stops the decompressor (not shown) to release the integrated workpiece WK (substrate SB) from suction and the transport unit (not shown) supports and collects the integrated workpiece WK (substrate SB). Each of the units then drives the corresponding drive device to return the components to the respective initial positions and the above operations are repeated.

The above exemplary embodiment eliminates the necessity of cutting the drawn sheets CS using a cutter, thus not requiring an increase in an apparatus size.

Though the best arrangement, process and the like for implementing the invention are disclosed as described above, the scope of the invention is not limited thereto. In other words, while the invention has been specifically explained and illustrated mainly in relation to a particular embodiment, a person skilled in the art could make various modifications in terms of shape, material, quantity or other particulars to the above described embodiment without deviating from the technical idea or any object of the invention. The description limiting the shapes and the materials disclosed above is intended to be illustrative for easier understanding and not to limit the invention. Hence, the invention includes the description using a name of component without a part of or all of the limitation on the shape and the material, etc.

Figure 2:
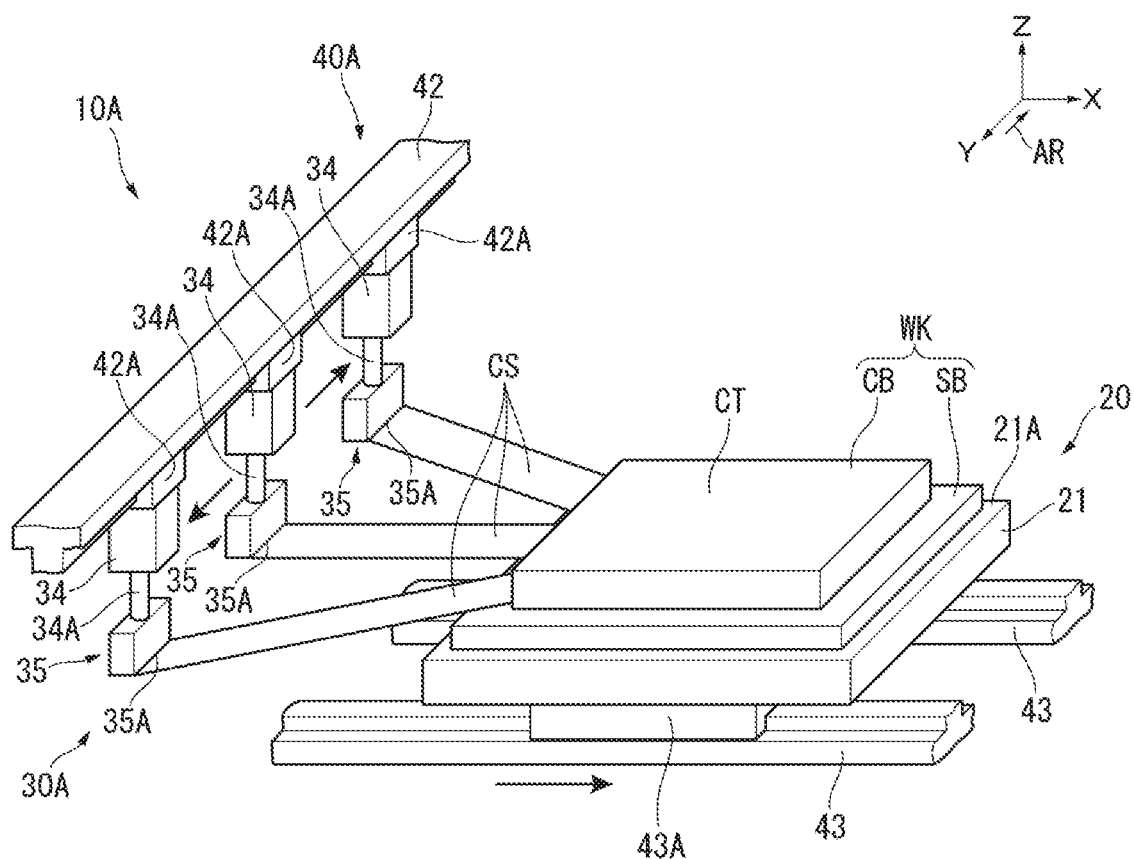
FIG. 2 is a perspective view showing a drawing apparatus according to a modification of the invention.

In some exemplary embodiments, as shown in FIG. 2, the drawing apparatus according to the invention is exemplified by a drawing apparatus 10A, which includes a support 30A and a drive unit 40A in place of the support 30 and the drive unit 40, respectively, the support 30A including: three linear movement motors 34 (drive device) each including an output shaft 34A: and three support members 35 each including a support unit 35A supported by the output shaft 34A of corresponding one of the linear movement motors 34, the drive unit 40A including: a first linear motor 42 (drive unit) including three sliders 42A each supporting corresponding one of the linear movement motors 34; and two second linear motors 43 (drive unit) each including a slider 43A supporting the holder 20. In this case, after the grown form CB is supported by each of the support members 35, which are closely aligned, the drive unit 40A drives the first and second linear motors 42, 43 to relatively move the support units 35A such that adjacent ones of the support unit 35A are separated from each other while moving the holder 20 rightward, thus drawing three sheets CS. For the relative movement of the three support units 35A and the holder 20, at least one of the timing or speed is optionally the same or different. To separate the support units 35A at both sides from the middle support unit 35A, at least one of the timing or speed of the movement of each of the support units 35A at both sides is optionally the same or different.

In some exemplary embodiments, the holder 20 holds the integrated workpiece WK using a chuck unit such as a mechanical chuck and chuck cylinder, a mechanism using Coulomb's force, adhesive, pressure-sensitive adhesive, magnetic force or Bernoulli adsorption, or a drive device, or does not hold the integrated workpiece WK.

When another device is used to hold the integrated workpiece WK, the holder 20 is not necessarily equipped to the drawing apparatuses 10 shown in FIGS. 1A, 1B and 2.

In some exemplary embodiments, the support units 32A, 35A are the same or different in shape.

In some exemplary embodiments, the support supports the grown form CB using a chuck unit such as a mechanical chuck and chuck cylinder, a mechanism using Coulomb's force, adhesive, pressure-sensitive adhesive or Bernoulli adsorption, or a drive device.

In some exemplary embodiments, to allow the grown form CB to be supported by the support units 32A or 35A of the support 30 or 30A, the integrated workpiece WK is vertically moved instead of vertically moving the support units 32A or 35A. Alternatively, both the support units 32A or 35A and the integrated workpiece WK are vertically moved.

In some exemplary embodiments, the support member 32 is made of, for instance, a round bar, a blade material, rubber, resin, or sponge.

In some exemplary embodiments, each support member 32 or 35 supports one support unit 32A or 35A or two or more support units 32A or 35A, and the apparatus includes single support member 32 or 35 or includes two or more support members 32 or 35.

In some exemplary embodiments, the assist member 33C of the assist unit 33 is inserted between the plurality of sheets CS by vertically moving the integrated workpiece WK instead of vertically moving the assist member 33C or by vertically moving both the assist member 33C and the grown form CB, the assist member 33C is omitted, the assist member 33C is an independent device, which is not supported by the drive unit 40, and the assist member 33C is not necessarily movable in the right-left direction.

In some exemplary embodiments, the assist member 33C is made of a round bar, a blade material, rubber, resin, or sponge. Alternatively, air is blown to assist in drawing the plurality of sheets CS without contact.

In some exemplary embodiments, the drive unit 40 or 40A moves one of the holder 20 and the support 30 or 30A while the other of the holder 20 and the support 30 or 30A is fixed, move both of the holder 20 and the support 30 or 30A, or move the holder 20 in a direction intersecting the right-left direction, such as diagonally upward right and diagonally downward right.

In some exemplary embodiments, the extended form according to the invention is a string-shaped article. In this case, the drawing apparatus optionally draws only a plurality of string-shaped extended forms from the single grown form or draws at least one string-shaped extended form and one sheet CS from the single grown form.

In some exemplary embodiments, the grown form CB is not necessarily supported by the substrate SB. In this case, the holder 20 optionally directly supports the grown form CB.

The invention is by no means limited to the above units and processes as long as the above operations, functions or processes of the units and processes are achievable, still less to the above merely exemplary arrangements and processes described in the exemplary embodiment. For instance, any support within the technical scope at the time of filing the application is usable as long as the support is capable of supporting a part of the grown form (explanation for other units and processes will be omitted).

For instance, the drive device in the above exemplary embodiment is provided by: motorized equipment such as a rotary motor, linear movement motor, linear motor, single-spindle robot and multi-joint robot; an actuator such as an air cylinder, hydraulic cylinder, rodless cylinder and rotary cylinder; or a direct or indirect combination thereof (some of the drive devices overlap with the exemplified drive devices in the exemplary embodiment).

The invention claimed is:

1. A method for using a drawing apparatus for drawing a plurality of extended forms from a single grown form produced by growing carbon nanotubes, the drawing apparatus comprising: a single support member on which a plurality of support units are formed, the plurality of support units being configured to support parts of the grown form; a drive device supporting the single support member; and a drive unit configured to cause a relative movement of the drive device supporting the single support member and the grown form, wherein the plurality of support units are arranged in a width direction of the grown form orthogonal to a drawing direction of the extended form, and wherein the drive device is configured to move the single support member in a direction toward the grown form in order for the plurality of support units to support the parts of the grown form, the direction crossing the width direction and the drawing direction, the method comprising:
supporting the parts of the grown form with the plurality of support units of the single support member supported by the drive device; and
causing the relative movement of the drive device supporting the single support member and the grown form to draw the plurality of extended forms from the single grown form.

2. The method according to claim 1, further comprising an assist unit configured to assist the drawing of the plurality of extended forms so that the plurality of extended forms to be drawn out do not contact each other.

3. A method of drawing a plurality of extended forms from a single grown form produced by growing carbon nanotubes, the method comprising:
supporting parts of the grown form with a plurality of support units formed on a single support member supported by a drive device, the plurality of support units being arranged in a width direction of the grown form orthogonal to a drawing direction of the extended forms, the drive device being configured to move the single support member in a direction toward the grown form in order for the plurality of support units to support the parts of the grown form, the direction crossing the width direction and the drawing direction; and
moving one of the drive device supporting the single support member and the grown form away from another of the drive device supporting the single support member and the grown form, while supporting the parts of the grown form with the plurality of support units of the single support member supported by the drive device, to draw the plurality of extended forms from the single grown form.

4. A method of drawing a plurality of extended forms from a single grown form produced by growing carbon nanotubes, the method comprising:
supporting parts of the grown form with a plurality of support units arranged in a width direction of the grown form orthogonal to a drawing direction of the extended forms; and
(1) causing a relative movement of the plurality of support units and the grown form, and (2) causing a gap between directly adjacent ones of the plurality of support units to increase in the width direction, to draw the plurality of extended forms from the single grown form.

* * * * *